United States Patent [19]

Clarke

[11] Patent Number: 4,519,816
[45] Date of Patent: May 28, 1985

[54] METHOD FOR THE RECOVERY OF SOLVENT VAPORS

[75] Inventor: Donald H. Clarke, Essexville, Mich.

[73] Assignee: The Dow Chemical Company, Midland, Mich.

[21] Appl. No.: 193,340

[22] Filed: Oct. 1, 1980

[51] Int. Cl.$^3$ ............................................... B01D 53/14
[52] U.S. Cl. .......................................... 55/59; 55/74; 55/196; 55/387; 55/528; 55/DIG. 13; 55/DIG. 42
[58] Field of Search ...................... 55/59, 74, 387, 528, 55/DIG. 13, DIG. 42, 96-97, 50, 60, 196, 198

[56] References Cited

U.S. PATENT DOCUMENTS

| | | |
|---|---|---|
| 2,211,162 | 8/1940 | Ray et al. .......................... 55/198 X |
| 3,075,333 | 1/1963 | Revell . |
| 3,127,256 | 3/1964 | Boylan . |
| 3,171,820 | 3/1965 | Volz .................................... 55/528 X |
| 3,252,691 | 5/1966 | Getzin et al. . |
| 3,308,610 | 3/1967 | Springer et al. . |
| 3,386,927 | 6/1968 | Rosecrans et al. ................. 55/97 X |
| 3,686,827 | 8/1972 | Haigh et al. ............................ 55/74 |
| 3,873,281 | 3/1975 | Himes et al. ............................ 55/96 |
| 3,997,303 | 12/1976 | Newton ................................... 55/97 |

FOREIGN PATENT DOCUMENTS

| | | | |
|---|---|---|---|
| 51-1361 | 1/1976 | Japan ..................................... 55/74 |
| 7406998 | 11/1974 | Netherlands ................. 55/DIG. 13 |

OTHER PUBLICATIONS

Bowen, H. J. M. *Absorption by Polyurethane Foams; New Method of Separation*, In J. Chem. Soc. (A), pp. 1082–1085, 1970.

*Primary Examiner*—Kathleen J. Prunner

[57] ABSTRACT

Polyurethane foams are employed to separate vapor of a volatile, organic liquid such as perchloroethylene from air or other gas containing the organic vapor. The absorbed, organic vapor can subsequently be recovered in liquid form by desorbing the vapor from the vapor laden foam and subsequently condensing the desorbed vapors.

4 Claims, 1 Drawing Figure

U.S. Patent        May 28, 1985        4,519,816
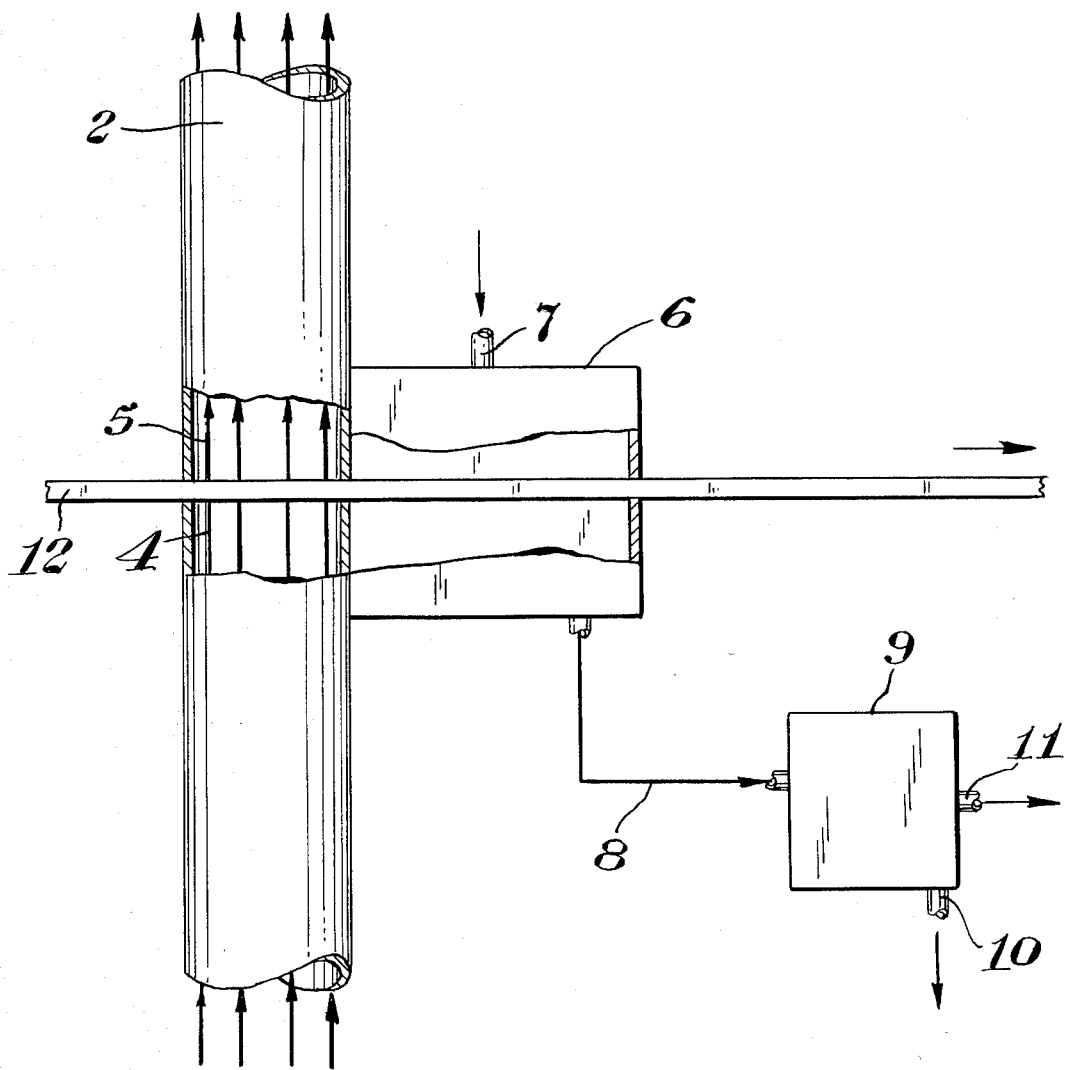

METHOD FOR THE RECOVERY OF SOLVENT VAPORS

BACKGROUND OF THE INVENTION

This invention relates to a method for the removal of organic vapor from a gas containing organic vapor and the recovery of the removed vapor.

Volatile organic solvents, e.g., perchloroethylene and 1,1,1-trichloroethane, are employed in a variety of applications such as dry cleaning and as a component in various coating and adhesive compositions. Due to the expense of such solvents and the potential hazards often attributed to the solvents, particularly the vapors thereof, it is generally desirable to remove the solvent vapors prior to the release of a gas containing said vapors to the atmosphere and to recover the solvent for reuse.

In one method employed heretofore for recovering the solvent vapor, the gas containing the vapors is cooled to a temperature sufficient to condense the solvent vapor. Unfortunately, since the concentration of the solvent is generally relatively low, e.g., air exiting from a dry cleaning unit often contains as little as 50 parts per million of the dry cleaning solvent (generally methylene chloride), extensive amounts of energy are required to recover the solvent.

In another prior art method for recovering the volatile solvent, the vapor laden gas is contacted with a bed of activated carbon or other particulate absorbent. Unfortunately, since the activated charcoal does not rapidly absorb the organic vapor, a relatively large bed or column is required to effectively remove the solvent vapor from the air, thereby necessitating a large outlay of capital, time and energy.

In view of these deficiencies of the prior art, it remains highly desirable to provide an economical and effective method for separating organic vapor from a gas containing said vapor and for subsequently recovering the organic material in a liquid form.

SUMMARY OF THE INVENTION

Accordingly, the present invention is a method for separating organic vapor from a gas containing said organic vapor. In said method, the gas containing the organic vapor is contacted with a polyurethane foam at conditions sufficient to reduce the concentration of the vapor in the gas. The absorbed vapor can subsequently be recovered in liquid form by desorbing the organic vapor and subsequently condensing the desorbed vapor.

Surprisingly, upon contacting the polyurethane foam with the gas containing the organic vapor, the foam quickly absorbs unexpectedly large amounts of the organic vapor, thereby effectively reducing the concentration of the organic vapor in the gas in relatively short periods. In addition, since the weight of vapor absorbed per unit weight of foam is unexpectedly large, relatively small amounts of foam are required to remove the desired amounts of the organic vapor from the gas. Moreover, the absorbed vapor is economically desorbed and recovered in liquid form.

The method of this invention is effectively employed in purifying gases containing vapor of a volatile, organic material and for recovering the organic material in a liquid form. Therefore, the method of the present invention is particularly useful for removing and recovering the solvents from the effluent gas of dry cleaning operations, in the recovery of solvents employed in paints from paint booth ventilation and other processes wherein organic vapors are released to the atmosphere.

BRIEF DESCRIPTION OF THE DRAWING

Understanding of the invention is facilitated by referring to the accompanying drawing, in which the FIGURE is a schematic representation, partly in cross-section, illustrating an embodiment of the present invention.

DETAILED DESCRIPTION OF THE PREFERRED EMBODIMENT

Referring now more particularly to the drawing, the FIGURE depicts a conduit 2 through which flows a gas 4 containing organic vapor such as the effluent gases from a dry cleaning or spray paint operation. An endless belt 12 of a polyurethane foam capable of absorbing or separating the organic vapor from the vapor laden gas is moved by a drive means (not shown) and passes through conduit 2 in a manner such that gas containing the organic vapor flows through a section of foam belt 12. In general, the drive means consists of a drive or friction roll mounted on the shaft of a suitable, variable-speed drive motor. In addition, one or more rotatably mounted support rolls and/or guides are provided to control the movement and guide the passage of foam belt 12. As the vapor laden gas 4 flows through the polyurethane foam, the organic vapor contained therein is absorbed by the foam. Gas 5, having passed through the foam, exhibits a reduced concentration of organic vapor.

In alternative methods for contacting the vapor laden gas with the urethane polymer foam, the foam can be prepared as a particulate, e.g., granules or spheroidal bead form, and the foam particulates contacted with the vapor laden gas. For example, in removing organic vapor from a so-called dry box, a body of the particulate polyurethane foam is disposed within the box and diffusion relied upon for carrying the organic vapor to the urethane foam. Alternatively, the removal of organic vapor is conducted by packing a column with the particulate foam and passing the vapor laden gas therethrough. In yet another method, the particulate foam is maintained within a suitable chamber or column and the gas passed upwardly therethrough to form a fluidized bed of foam particles.

Using any of these methods for contacting the vapor laden gas with the foam, the organic material is recovered in liquid form by desorbing the vapor from the foam and condensing the desorbed vapor. As depicted by the FIGURE, a means for removing the organic vapor from the vapor laden foam is in close proximity to conduit 2 and typically consists of a removal zone or chamber 6 through which the vapor laden foam passes immediately upon its exit from conduit 2. A fresh gas conduit 7 communicates chamber 6 to a source of gas which is suitably employed in removing or desorbing the organic vapor from the vapor laden foam. As the vapor laden foam passes through desorption chamber 6, the organic, vapor-free gas from conduit 7, advantageously a gas containing essentially none of the organic vapor, preferentially air at slightly elevated temperatures (e.g., from about 30° to about 70° C.), flows through the vapor laden foam, thereby causing the rapid desorption of the vapor therefrom. The conditions of such desorption, e.g., flow rates of the organic vapor-free gas and the temperature thereof, are controlled such that essentially all the organic vapor is removed from the foam. Thereafter, the foam can be recycled through the conduit 2 containing the vapor laden gas.

The removal or desorption chamber 6 is communicated with a heat exchanger or condenser 9 by means of line 8. The condenser 9 condenses the organic vapor desorbed from the polyurethane foam and contained by the gas flowing through line 8. The condensed vapor is withdrawn from condenser 9 by means of condensed vapor withdrawal conduit 10 and is generally sufficiently pure for reuse in the operation or composition originally employing said liquid. The gas not being condensed in condenser 9 is withdrawn therefrom by means of purified gas withdrawal conduit 11 and advantageously comprises essentially no organic vapor, i.e., the condensation is conducted at conditions which remove essentially all the organic vapor from the gas. As such, this gas can be released to the atmosphere without further treatment. Since the amounts of organic vapor-free gas required to desorb the organic vapor from the polyurethane foam are significantly less than the vapor laden gas contacting the foam in conduit 2 (i.e., the organic vapor concentration in line 8 is significantly higher than the vapor concentration in the gas flowing through conduit 2), the energy required to recover the organic material in liquid form is substantially reduced by the method of this invention when compared to the energy required to condense the vapor directly from the effluent gas flowing through conduit 2.

With regard to the various components in the practice of this invention, the organic vapor containing gas (i.e., vapor laden gas) comprises a mixture of a normally gaseous material (hereinafter referred to as a "carrier gas") and an organic vapor. Organic vapors suitably employed herein are vapors capable of being absorbed or separated from air or other gas by a polyurethane foam. In general, the organic vapor is the vapor of a volatile, organic liquid which is normally liquid, i.e., liquid at ambient temperatures (e.g., from about 18° to about 25° C.). Advantageously, said volatile, organic liquid will exhibit a vapor pressure of at least about 10, preferably at least about 20 mm Hg at 20° C. and 760 mm Hg. Representative volatile, organic liquids exhibiting such vapor pressures include the halogenated hydrocarbons, particularly chlorinated or fluorinated hydrocarbons such as methylene chloride, perchloroethylene, 1,1,1-trichloroethane, Freon® and the like; aromatic hydrocarbons such as toluene and xylene; aliphatic ketones such as acetone and methyl ethyl ketone; and the like. The present invention has been found to be particularly effective for removing and recovering a halogenated hydrocarbon, particularly methylene chloride, Freon® 11, perchloroethylene and 1,1,1-trichloroethane.

The gas containing said organic vapor is suitably any normally gaseous material, i.e., gaseous at ambient temperatures, capable of flowing through a polyurethane foam. Advantageously, the carrier gas passes through the polyurethane foam without significant amounts thereof being absorbed and/or chemically reacted with the foam while allowing the foam to absorb the organic vapor. In general, gases such as oxygen, nitrogen, carbon dioxide, carbon monoxide, hydrogen, ammonia, chlorine, noble gases such as neon and helium, normally gaseous hydrocarbons such as methane and ethane, propane and butane and mixtures of one or more such gases including air are advantageously employed herein. The present invention is particularly useful when air, oxygen or nitrogen is employed as the carrier gas, with air being generally the most preferred.

Polyurethane foams suitably employed herein are open-cell polyurethane foams permeable to the vapor laden gas which foams are capable of absorbing the organic vapor such that the concentration of the organic vapor is measurably reduced as the vapor laden gas passes through the foam. The term "polyurethane foam" is used conventionally herein and refers generally to the foam of a thermoplastic polymer produced by the condensation reaction of a polyisocyanate and a hydroxyl-containing material.

Polyisocyanates (which term includes diisocyanates) and hydroxyl-containing compounds, particularly, polyols, including diols, useful in preparing the urethane polymer foams are those polyisocyanates and polyols employed heretofore in the preparation of polyurethanes. Illustrative of such isocyanates and hydroxyl containing compounds are disclosed in U.S. Pat. No. 4,111,914 which is hereby incorporated by reference. In general, the composition of the polyurethane foam, i.e., the particular polyisocyanate and polyol reactants and the percentage of each reactant, will affect the capability of the foam to remove the organic vapor from the vapor laden gas and the type and amount of each reactant most advantageously employed herein will vary depending on the specific organic vapor to be removed. Polyisocyanates advantageously employed herein are toluene-2,4-diisocyanate; toluene-2,6-diisocyanate, diphenylmethane diisocyanate, triphenylmethane triisocyanate, polymethylene polyphenyl polyisocyanate, hexamethylene diisocyanate, isophorone diisocyanate or mixtures thereof. Hydroxyl-containing compounds advantageously employed include monomeric polyhydroxyl compounds, e.g., ethylene or propylene glycol, and the polyoxyalkylene polyols such as the condensation reaction product of an alkylene glycol (e.g., ethylene or propylene glycol), or an adduct of an alkylene oxide (e.g., ethylene or propylene oxide) or halogenated alkylene oxide with water, amine, sucrose, glycerol or similar initiated polyether polyols. The preferred foams are generally prepared from a mixture of toluene-2,4-diisocyanate and toluene-2,6-diisocyanate and a polyoxyalkylene polyol. In general, the foams are advantageously comprised of from about 20 to about 40, preferably from about 25 to about 35, weight percent of the polyisocyanate and from about 80 to about 60, preferably from about 75 to about 65, weight percent of polyol.

Methods for preparing the urethane polymer foams, including catalysts, foaming agents and the like, are well known in the art and reference is made thereto for the purposes of this invention. In general, polyurethane foams are prepared by contacting the reactants in the presence of a basic catalyst, i.e., N-methyl morpholine or 2-diethylethanolamine, e.g., polydimethylethanolamine, a surfactant such as a silicone, e.g., polydimethyl siloxane, and a blowing or foaming agent such as a low temperature boiling liquid, e.g., chlorofluoromethane.

Advantageously, the urethane polymer foam is employed at conditions sufficient to remove at least about 75, preferably at least about 90, more preferably at least about 95, percent of the organic vapor from the vapor laden gas. Most preferably, essentially all the organic vapor is removed from the vapor laden gas by the foam. In general, the amount of organic vapor removed from the vapor laden gas can be varied by increasing the contact time between the foam and the vapor laden gas, e.g., by increasing the thickness of the foam belt (or the size of the bed containing the particulate foam through which the vapors are passed) and/or varying the velocity of the vapor laden gas as it passes through the foam belt or bed. In general, the conditions required to obtain the desired reduction in concentration of organic vapor are dependent on a variety of factors including the particular organic vapor and carrier gas employed, the concentration of the organic vapor in the vapor laden gas, the desired reduction in the concentration of the organic vapor and the specific urethane foam employed. Typically, the hereinbefore described urethane foams will absorb from about 0.2 to about 1, more generally from about 0.5 to about 0.8, g of vapor per g of foam at saturation and will generally absorb from about 0.1 to about 0.9, more generally from about 0.2 to about 0.7, g of vapor per g of foam within the initial five minutes of contact and the conditions required to reduce the organic vapor to a desired concentration selected accordingly.

The following examples are presented to illustrate the present invention and should not be construed to limit its scope. All percentages and parts in the examples are by weight unless otherwise indicated.

EXAMPLE 1

To a 1000 ml beaker is added 100 ml of liquid methylene chloride and the beaker subsequently sealed against air loss. After allowing the methylene chloride to saturate the air contained by the beaker, a piece of an open-cell polyurethane foam derived from 38 parts of a mixture of 80 percent toluene-2,4-diisocyanate and 20 percent toluene-2,6-diisocyanate and 100 parts of a glycerine initiated polyether triol having a number average molecular weight of 4,000 and having dimensions of 25 mm×25 mm×63 mm and a weight of 1.23 g is suspended in the air space above the liquid methylene chloride, which air space contains the methylene chloride vapor. The weight of the foam is measured at various intervals over a one-hour period to determine the rate at which the foam absorbs the methylene chloride from the air saturated with the methylene chloride. At the end of this one-hour period, the foam is found to be saturated with the methylene chloride. The foam is subsequently removed from the beaker and placed in an environment of air containing essentially no methylene chloride. The weight of the foam is again measured at various times over a 10-minute period to determine the rate at which the methylene chloride is desorbed from the foam.

The weight gain with time exhibited by the foam in the methylene chloride containing air and the subsequent weight loss of the foam due to the desorption of the methylene chloride with time are recorded in Table I.

TABLE I

Absorption/Desorption of $CH_2Cl_2$ By Urethane Foam Of The Reaction Product of A Diisocyanate And Polyether Triol

| Absorption Cycle (1) | | | Desorption Cycle (2) | | |
|---|---|---|---|---|---|
| Time, Min. | Weight, g | Weight Gain, g | Time, Min. | Weight, g | Weight Loss, g |
| 0 | 1.23 | — | 0 | 1.95 | — |
| 2.5 | 1.56 | 0.33 | 2.5 | 1.40 | 0.55 |
| 5 | 1.65 | 0.42 | 5 | 1.33 | 0.62 |
| 7.5 | 1.69 | 0.46 | 7.5 | 1.30 | 0.65 |
| 10 | 1.73 | 0.50 | 10 | 1.30 | 0.65 |
| 60 | 1.95 | 0.72 | | | |

(1) Absorption cycle refers to that period wherein the foam is suspended in air saturated with methylene chloride. The time refers to the time after which the foam was initially placed in the methylene chloride saturated air and the weight gain is the weight of methylene chloride absorbed by the foam.
(2) Desorption cycle refers to that period wherein the methylene chloride saturated foam is suspended in air containing essentially no methylene chloride. The time refers to the time after removal from the methylene chloride saturated air and the weight loss indicates the amount of methylene chloride desorbed by the foam.

As evidenced by the data in Table I, the urethane foam polymers rapidly absorb or extract large amounts of an organic vapor from air containing said vapor. In addition, a large amount of the absorbed vapors are readily desorbed in relatively short periods.

When the procedure is repeated, except an identical urethane polymer foam piece is placed in air saturated with Freon ® 11, 0.27 g of the Freon ® 11 vapors are absorbed per g of foam after only 2.5 minutes and 0.38 g of the vapors absorbed per g of foam after about 20 minutes. This again indicates the ability of the urethane polymer foam to quickly absorb relatively large amounts of organic vapor from air.

EXAMPLE 2

Following the procedure of Example 1, the various urethane polymer foams specified in Table II are tested to evaluate their ability to absorb methylene chloride from air saturated with methylene chloride. The results of the testing are reported in Table II, with the absorption capability of each foam being reported as the amount of methylene chloride absorbed by the foam (1) after 5 minutes exposure to the methylene chloride saturated air and (2) at saturation of the foam with the organic vapor.

TABLE II

| | Urethane Foam (1) | | | |
|---|---|---|---|---|
| Sample No. | Ingredients PNCO:Polyol | Concentration, % PNCO:Polyol | Saturation Wt., G-$CH_2Cl_2$/G-Foam (2) | Wt. Gain @ 5 Min. (3) |
| 1 | 2,4/2,6:PE-4701 | 73:27 | 0.65 | 35 |
| 2 | 2,4/2,6:PE-3010 | 70:30 | 0.54 | 53 |
| 3 | 2,4/2,6:PE-6801 | 73:27 | 0.72 | 41 |

TABLE II-continued

| | Urethane Foam (1) | | | |
|---|---|---|---|---|
| Sample No. | Ingredients PNCO:Polyol | Concentration, % PNCO:Polyol | Saturation Wt., G-CH$_2$Cl$_2$/G-Foam (2) | Wt. Gain @ 5 Min. (3) |
| 4 | 2,4/2,6:PE-3001 | 70:30 | 0.58 | 46 |

(1) The ingredients are expressed in abbreviated form with the polyisocyanate (PNCO) designated 2,4/2,6 referred to a mixture of 80 percent of toluene-2,4-diisocyanate and 20 percent of toluene-2,6-diisocyanate and the polyol designation being:
PE-4701 = a glycerine initiated polyether polyol of propylene oxide capped with ethylene oxide and having a number average molecular weight of about 4700. This material is designated as Voranol ® 4701 by The Dow Chemical Company.
PE-6801 = same as above except having a number average molecular weight of about 6800 and designated as Voranol ® 6801 by The Dow Chemical Company.
PE-3001 = same as above except having a number average molecular weight of about 3000 and designated as Voranol ® 3001 by The Dow Chemical Company.
PE-3010 = a glycerine initiated polyether polyol of a mixture of ethylene oxide and propylene oxide having a number average molecular weight of 3000 designated as Voranol ® 3010 by The Dow Chemical Company.
The concentrations are set forth as the percent polyisocyanate (PNCO) and percent polyol based on the total weight of the polyisocyanate and polyol.
(2) The amount of methylene chloride absorbed by the foam at saturation expressed as grams of methylene chloride per gram of foam.
(3) The weight gain exhibited by the foam after 5 minutes exposure to the methylene chloride saturated air expressed as a percentage of the total weight gain by the foam at saturation.

As evidenced by the data recorded in Table II, a variety of urethane polymer foams are effective in removing organic vapor from air. The rate at which the vapor is removed and the total amounts of the vapor which can be removed are shown to be dependent on the particular foam employed.

EXAMPLE 3

A polyurethane foam having dimensions of 7.6 cm × 7.6 cm and a thickness of 2.54 cm is fitted between two chambers such that the gas flowing from the first chamber to the second chamber passes through the urethane foam. Both chambers are originally filled with air containing essentially no methylene chloride. A gas stream containing about 1920 ppm of methylene chloride is fed to the first chamber at a rate of 350 cm$^3$/sec. Due to the flow of the methylene chloride-containing gas into the first chamber, gas containing varying amounts of methylene chloride are forced through the polyurethane foam into the second chamber. After 5 minutes, the concentration of the methylene chloride in the first chamber is about 1400 ppm, whereas the second chamber continues to contain essentially no methylene chloride. Fifteen minutes after initiating the feed of the methylene chloride-containing gas, the methylene chloride concentration in the first chamber is over 1870 ppm, while the methylene chloride in the second chamber remains less than 200 ppm.

The effectiveness of a urethane polymer foam in absorbing 1,1,1-trichloroethylene from air containing 256 ppm of 1,1,1-trichloroethylene is measured using similar techniques except the vapor containing gas is fed to the first chamber at a flow rate of 650 cm$^3$/min. Three minutes after initiation of the gas flow, the first chamber contains 210 ppm of the 1,1,1-trichloroethylene and the second chamber continues to contain no detectable levels of the 1,1,1-trichloroethylene. After 7 minutes, the first chamber contains over 250 ppm of the organic vapor while the concentration of the vapor in the second chamber is less than 30 ppm.

By this method, the urethane polymer foam is found to effectively absorb organic vapor from a gas containing said vapor.

What is claimed is:

1. A method for recovering vapor of a volatile, organic liquid in a liquid form from a gas containing the organic vapor, said method comprising the steps of
   (a) contacting the gas containing the organic vapor with a gas permeable polyurethane foam at conditions sufficient to reduce the concentration of the vapor in the gas;
   (b) desorbing the organic vapor from the foam; and
   (c) condensing the desorbed vapor.

2. The method of claim 1 wherein the gas containing the organic vapor is air and the organic vapor is a halogenated hydrocarbon, an aromatic hydrocarbon or an aliphatic ketone.

3. The method of claim 2 wherein the polyurethane foam is the reaction product of toluene-2,4-diisocyanate, toluene-2,6-diisocyanate or a mixture thereof with a hydroxyl-containing compound of a monomeric polyhydroxyl compound or a polyoxyalkylene polyol.

4. The method of claim 3 wherein the hydroxyl-containing compound is a polyoxyalkylene polyol derived from ethylene or propylene glycol or ethylene or propylene oxide.

* * * * *